United States Patent
Yamaguchi et al.

(10) Patent No.: US 8,182,394 B2
(45) Date of Patent: May 22, 2012

(54) SPEED CHANGE CONTROLLER OF WORKING VEHICLE

(75) Inventors: Eiji Yamaguchi, Komatsu (JP); Masaaki Kuma, Hakusan (JP); Takashi Kuse, Komatsu (JP)

(73) Assignee: Komatsu Ltd., Tokyo (JP)

( * ) Notice: Subject to any disclaimer, the term of this patent is extended or adjusted under 35 U.S.C. 154(b) by 245 days.

(21) Appl. No.: 12/679,556

(22) PCT Filed: Aug. 27, 2008

(86) PCT No.: PCT/JP2008/065239
§ 371 (c)(1),
(2), (4) Date: Mar. 23, 2010

(87) PCT Pub. No.: WO2009/041205
PCT Pub. Date: Apr. 2, 2009

(65) Prior Publication Data
US 2010/0197459 A1 Aug. 5, 2010

(30) Foreign Application Priority Data
Sep. 28, 2007 (JP) .................................. 2007-254368

(51) Int. Cl.
*F16H 61/58* (2006.01)
(52) U.S. Cl. ........................................................ 477/65
(58) Field of Classification Search .................. 192/3.26
See application file for complete search history.

(56) References Cited

U.S. PATENT DOCUMENTS

| | | | | |
|---|---|---|---|---|
| 5,040,648 A | * | 8/1991 | Mitchell et al. ............... | 192/3.58 |
| 5,380,257 A | * | 1/1995 | Coffman et al. ............... | 477/175 |
| 5,509,520 A | * | 4/1996 | Evans et al. ................... | 192/3.23 |
| 5,613,581 A | * | 3/1997 | Fonkalsrud et al. .......... | 192/3.23 |
| 5,947,242 A | * | 9/1999 | Creger ........................... | 192/3.23 |
| 6,984,190 B2 | * | 1/2006 | Legner ............................ | 477/53 |
| 7,022,044 B2 | * | 4/2006 | Legner et al. ................... | 477/68 |
| 2004/0157701 A1 | | 8/2004 | Legner ............................ | 477/53 |

FOREIGN PATENT DOCUMENTS

DE 3626100 A1 2/1987
(Continued)

OTHER PUBLICATIONS

International Search Report for International Application No. PCT/JP2008/065239 dated Oct. 22, 2008.
Supplementary European Search Report dated May 11, 2011.

*Primary Examiner* — Dirk Wright
(74) *Attorney, Agent, or Firm* — Kratz, Quintos & Hanson, LLP (57) ABSTRACT

Provided is a device for performing speed change not leading to engine stall in a working vehicle such as a wheel loader while sustaining a required tractive force and reducing fuel consumption. When a speed ("forward", "second speed") suitable for a work is selected by a speed change operator, control means makes a modulation clutch engaged in response to the vehicle speed drop and makes a lock-up state where a lock-up clutch is engaged transit to a lock-up and modulation clutch slip state where the lock-up clutch is engaged while the modulation clutch slips. Subsequently, the control means performs a clutch control for causing a transition to both clutch slip state where the lock-up clutch and the modulation clutch slip in response to the vehicle speed drop, hence causing the transition to a torque converter operation state where the modulation clutch is engaged and the lock-up clutch is released.

6 Claims, 7 Drawing Sheets

FOREIGN PATENT DOCUMENTS

| | | |
|---|---|---|
| EP | 1 302 358 A2 | 4/2003 |
| JP | 4-49253 | 4/1992 |
| JP | 8-4876 | 1/1996 |
| JP | 2001-146928 A1 | 5/2001 |
| JP | 2006-22939 A1 | 1/2006 |
| WO | WO 2005/040629 A1 | 5/2005 |

* cited by examiner

FIG.5A THROTTLE AMOUNT

→ TIME t

FIG.5B VEHICLE SPEED V

→ TIME t

FIG.5C ENGINE SPEED N

→ TIME t

FIG.5D SPEED STAGE

→ TIME t

FIG.7

SPEED CHANGE CONTROLLER OF WORKING VEHICLE

TECHNICAL FIELD

The present invention is an invention relating to a working vehicle in which a power of an engine is transmitted as a driving force to wheels (tires) through a driving force transmission path, and more specifically, relating to a device for controlling speed change.

BACKGROUND ART

In a driving force transmission path from an engine of a wheel loader to wheels (tires), there provided a transfer, a modulation clutch, a torque converter having lockup clutch (torque converter, lockup clutch), a transmission having a forward-drive clutch, a backward-drive clutch and speed stage clutches, and a reduction gear.

An output (torque) of the engine is transmitted to the wheels (tires) through the transfer, the modulation clutch, the lockup clutch or torque converter in the torque converter having lockup clutch, the transmission, and the reduction gear.

Conventionally, the modulation clutch is provided in the working vehicle such as wheel loader between the engine and the torque converter for changing the degree of engagement between an input side and an output side to vary the power transmitted from the engine to the torque converter. The modulation clutch is formed by a hydraulic clutch, and the hydraulic clutch performs engagement operation (connection operation) or releasing operation (disconnection operation) by changing the amount of hydraulic pressure.

The degree of engagement of the modulation clutch is adjusted by an inching pedal. By changing, as required, the driving force transmitted to the tires by the modulation clutch, it becomes possible to implement the inching operation, namely, the creeping-speed travel or appropriate combined operation between work equipment and travel, whereby working efficiency can be improved.

The torque converter having lockup clutch is disposed between the modulation clutch and the transmission. When a load is applied to the wheels, that is, when a force that prevents rolling of the wheels is applied, the torque converter in the torque converter having lockup clutch automatically and steplessly changes the torque transmitted to the transmission in accordance with change in the load, and changes the driving force of the wheels to prevent the engine stall. Note that, in order to ensure the tractive force during operation, the torque converter of the wheel loader has a relatively large stall-torque ratio as compared with other working vehicles.

The lockup clutch in the torque converter having lockup clutch is located between the modulation clutch and the transmission, and is provided in parallel with the torque converter in the torque converter having lockup clutch. For covering up the power loss in the torque converter, the lockup clutch becomes a lockup state (clutch engagement state) by directly coupling a pump with a turbine of the converter in a speed range where the property of the torque converter is not required.

In the wheel loader, the lockup clutch is automatically operated in accordance with conditions. This means, the lockup clutch is automatically made ON (engagement operation) and OFF (releasing operation) in accordance with conditions.

The transmission selectively implements the engagement operation or the releasing operation of the forward-drive clutch, a backward-drive clutch and speed stage clutches in accordance with a direction to be advanced, a driving force required, and a speed (traveling speed) required.

A cab of the wheel loader is provided with a forward-backward selecting operation lever, a speed changing lever and a kickdown switch. By operating the forward-backward selecting operation lever or the speed changing lever, a shift range including respective speed stages of a forward drive (F), a backward drive (R), a first speed, a second speed, a third speed, and a fourth speed can be selected.

When the forward-backward selecting operation lever and the speed changing lever are operated to be positions of "forward" and "second speed," the forward-drive clutch and the second speed stage clutch are selectively engaged in the transmission. The engagement is fixed to this forward second speed stage (referred to as "F2"), as long as the speed changing lever is not operated to be other position or the kickdown switch is not operated to be ON.

The kickdown switch is provided, for example, at a work equipment operation lever. When the forward-backward selecting operation lever and the speed changing lever are operated to be positions of "forward" and "second speed" while the kickdown switch is operated to be ON, a downshift is made to be a forward first speed stage (referred to as "F1"). As a result, further strong driving force (tractive force) can be obtained at the wheels. That is, the position of "second speed" has a shift range including the second speed and the first speed (at the time when the kickdown switch is ON).

Note that, at the position of "forth speed," the speed change is automatically performed between the second speed, the third speed, and the fourth speed. By operating the kickdown switch to be ON, the downshift is made from the fourth speed to the third speed. Additionally, at the position of "third speed," the speed change is automatically performed between the second speed and the third speed. By operating the kickdown switch to be ON, the speed is shifted down from the third speed to the second speed.

As one typical operation mode performed by the wheel loaders, there exists a V-shape (loading) operation.

The V-shape operation is an operation in which the wheel loader advances into a mound of soil and excavates the soil; the wheel loader reverses after excavating the soil; the wheel loader changes its direction upon arriving at a direction changing point; the wheel loader goes forward and loads the soil into a hopper or a dump truck; and, the wheel loader repeats this path.

At the time of excavation, the wheel loader performs an operation in which the work equipment for excavation is entered toward the mound of soil while accelerating. At this time, the load applied to the wheels is heavy, and hence a large driving force from the engine is required at the wheels.

Since, during the V-shape operation, the most of the work is operated at a low speed and requires the large driving force (tractive force), the work is usually operated by maintaining the speed changing lever to be the "second speed." Additionally, when the wheel loader operates extremely heavy excavating operation, such as when entered into the mound of soil, the kickdown switch is operated to be ON on the basis of operator's will, and the speed stage is shifted down to the forward first speed stage (F1).

Additionally, during the V-shape operation, forward-backward changing is repeatedly performed at a lower speed, and the wheel loader mainly operates its (heavy) excavating work in a situation where the vehicle speed is almost zero or close to zero. Therefore, in order to prevent the engine stall, the lockup clutch is usually in a released state, and the driving force of the engine is transmitted to the wheels through the torque converter (hereinafter, referred to as torque converter operation state).

As described above, during the V-shaped operation, the "torque converter operation state" is always maintained. When the larger driving force is necessary at the time of heavy excavation and so on, the speed stage is changed from the forward second speed stage F2 to the forward first speed stage F1. Note that the state where the lockup clutch is in an engaged state is hereinafter referred to as a lockup state.

Note that, at the position of "second speed," as the vehicle speed decreases, the state sequentially changes in the order of the lockup state with F2, the torque converter operation state with F2, and the torque converter operation state with F1.

Incidentally, the original purpose of using the modulation clutch is to perform the inching operation as described above.

Conventionally, during operation using the wheel loader, tire slips are prevented by controlling the degree of engagement of the modulation clutch.

Patent literature 1 describes an invention in which a difference in the number of rotations between the right and the left driving wheels of the working vehicle is calculated; as the calculated difference in the number of rotations increases, the modulation clutch pressure is decreased to weaken the degree of engagement of the modulation clutch; and the driving force transmitted to the tires is decreased.

Patent Literature: Japanese Patent Application Laid-open No. 2001-146928

DISCLOSURE OF THE INVENTION

Problems to be Solved by the Invention

In the wheel loaders, there are demands that the amount of fuel consumption be further reduced while maintaining a required tractive force.

However, conventionally, at all times during the V-shaped operation, which is the typical operation made by using the wheel loaders, the "torque converter operation state" is maintained and the driving force of the engine is transmitted to the wheels through the torque converter. Therefore, transmission loss of the driving force at the torque converter is great and the torque converter operation state continues throughout the V-shaped operation, so that deterioration in the amount of fuel consumption is unavoidable. In other words, this is because, with the conventional wheel loaders, at the time of the forward first speed stage F1, the wheel loader is always in the torque converter operation state in consideration of the operability during the V-shaped operation; and, if the kickdown switch is operated to be ON in the forward second speed stage F2, the speed change is made to the torque converter operation state with the forward first speed stage F1 without passing through the lockup stage with the forward first speed stage F1. Therefore, although no specific problem arises at the time of the V-shaped operation, the fuel consumption deteriorates when the wheel loader travels at a prescribed speed or lower with the shift range of "second speed," in other words, when the wheel loader travels slow at a vehicle speed or lower at which the wheel loader is in the torque converter operation state with the forward second speed stage F2.

Here, at the time of heavy excavation such as entry into the mound of soil, it is certainly necessary to obtain the strong tractive force by operating the kickdown switch to be ON to make a downshift to the forward first speed stage F1 while maintaining the torque converter operation state, even if the amount of fuel consumption is disregarded. However, except when the wheel loader operates the heavy excavating operation, a large tractive force is not required, and hence, rather, by making the lockup clutch engaged, it can be expected that the transmission loss can be reduced, whereby the amount of fuel consumption can be reduced.

However, if the lockup clutch is simply made engaged (lockup state), it is certain that the transmission loss of the driving force can be reduced and the amount of the fuel consumption can be reduced as compared with that in the torque converter operation state, but the engine will be easily stalled at the time of forward-backward changings at the lower speed or at the time of (heavy) excavation with the vehicle speed being almost zero or close to zero, because the engine speed largely decreases as the vehicle speed lowers.

The present invention is made in view of the circumstances above, and a problem to be solved of the present invention is to, in a working vehicle such as a wheel loader, further reduce the amount of fuel consumption while maintaining a required tractive force, and realize speed change without engine stall.

Note that, as described above, the original purpose of using the modulation clutch is to perform the inching operation as described above. And, as can be understood from the Patent Literature, conventionally, there exists only an example in which the degree of engagement of the modulation clutch is controlled for preventing the tire slips. There exists no conventional example in which the modulation clutch is used for controlling the speed change, as described in the present invention.

Means to Solve the Problems

A first aspect of the present invention provides a speed change control device of a working vehicle, in which a power of an engine is transmitted as a driving force to wheels through a modulation clutch, a torque converter having a lockup clutch, and a transmission, which includes: a speed change operator; and, a controller that controls at least the modulation clutch and the lockup clutch of the torque converter having the lockup clutch, wherein the controller performs a clutch control so as to: cause a lockup state in which the modulation clutch is engaged while the lockup clutch is engaged, when a vehicle speed becomes a first vehicle speed or lower; cause a lockup and modulation clutch slipping state in which the modulation clutch slips while the lockup clutch remains engaged, when the vehicle speed becomes a second vehicle speed or lower, the second vehicle speed being lower than the first vehicle speed; and cause a torque converter operation state in which the modulation clutch is engaged while the lockup clutch is released, when the lockup and modulation clutch slipping state continues for a prescribed period of time or longer, or when the vehicle speed becomes a third vehicle speed or lower, the third vehicle speed being lower than the second vehicle speed.

A second aspect of the present invention provides a speed change control device of a working vehicle, in which a power of an engine is transmitted as a driving force to wheels through a modulation clutch, a torque converter having a lockup clutch, and a transmission, which includes: a speed change operator; and, a controller that controls at least the modulation clutch and the lockup clutch of the torque converter having the lockup clutch, wherein the controller performs a clutch control so as to: cause a lockup state in which the modulation clutch is engaged while the lockup clutch is engaged, when a vehicle speed becomes a first vehicle speed or lower; cause a lockup and modulation clutch slipping state in which the modulation clutch slips while the lockup clutch remains engaged, when the vehicle speed becomes a second vehicle speed or lower, the second vehicle speed being lower than the first vehicle speed; cause a both clutch slipping state in which both the lockup clutch and the modulation clutch slip, when the lockup and modulation clutch slipping state continues for a prescribed period of time or longer or when the vehicle speed becomes a third vehicle speed or lower, the third vehicle speed being lower than the second vehicle speed; and, cause a torque converter operation state in which the modulation clutch is engaged while the lockup clutch is released, when the state is in the both clutch slipping state and an engine speed is a prescribed speed or lower.

A third aspect of the present invention provides the speed change control device of a working vehicle according to the first aspect of the present invention, wherein the controller performs a control in which, in the lockup and modulation clutch slipping state, the engine speed is maintained at a prescribed speed or higher.

A fourth aspect of the present invention provides the speed change control device of a working vehicle according to the second aspect of the present invention, wherein the controller performs a control in which, in the lockup and modulation clutch slipping state, the engine speed is maintained at a prescribed speed or higher.

A fifth aspect of the present invention provides the speed change control device of a working vehicle according to the first aspect of the present invention, wherein the speed change operator includes a kickdown switch, and the controller makes a transition to the torque converter operation state upon operation of the kickdown switch to be ON.

A sixth aspect of the present invention provides a speed change control device of a working vehicle according to the second aspect of the present invention, wherein the speed change operator includes a kickdown switch, and the controller makes a transition to the torque converter operation state upon operation of the kickdown switch to be ON.

Figure 1:
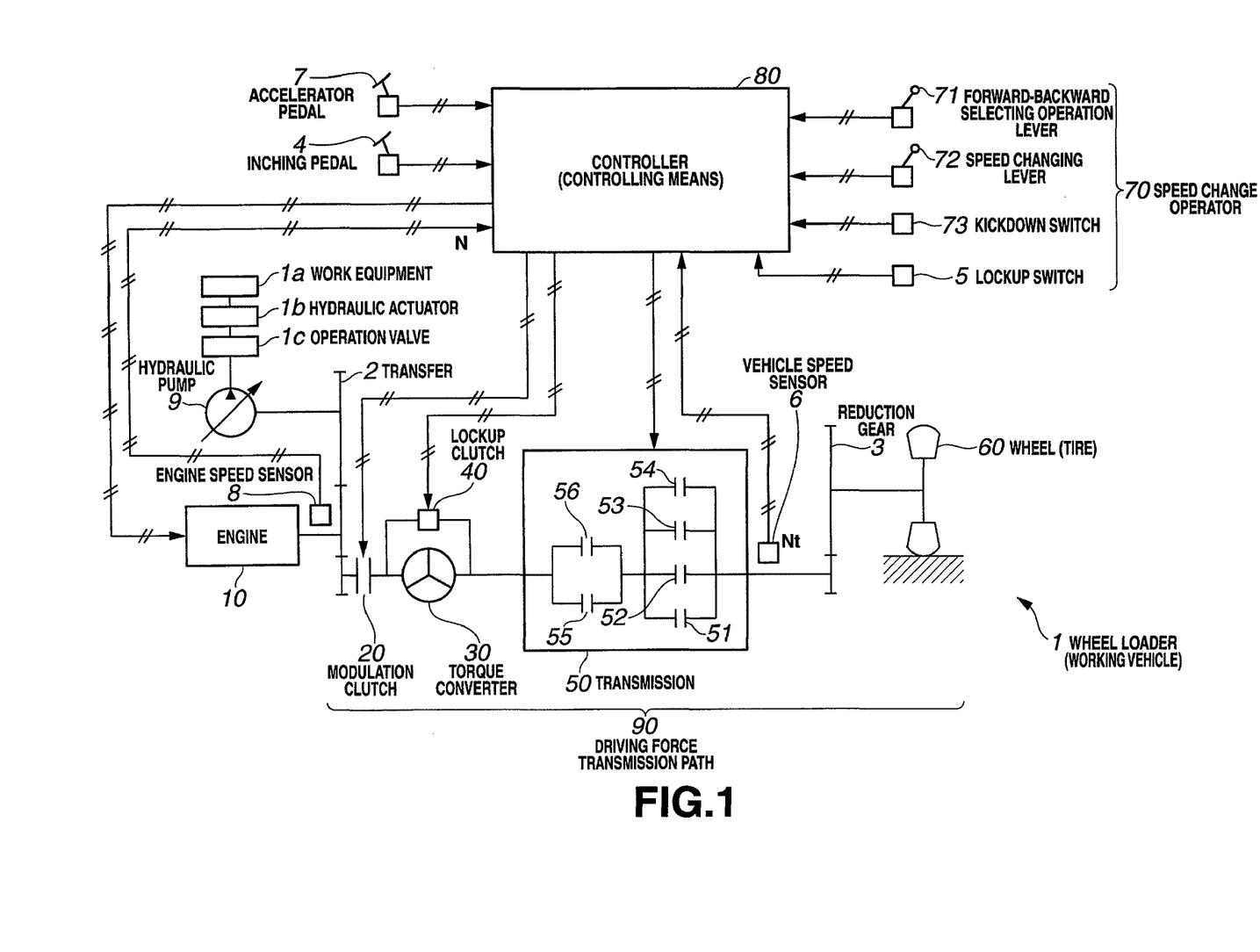
FIG. 1 is a block diagram illustrating a configuration of an engine speed controlling device of a working vehicle of an embodiment, and shows pertinent portion of a configuration of a wheel loader according to the present invention.

As shown in FIG. 1, the present invention is applied to a working vehicle 1 that has a work equipment 1a and travels at a speed stage selected by using a speed change operator 70, in which a power of an engine 10 is transmitted as a driving force to wheels 60 through a modulation clutch 20, a torque converter 30 or a lockup clutch 40 in a torque converter having lockup clutch 35, and a transmission 50.

Figure 3A:
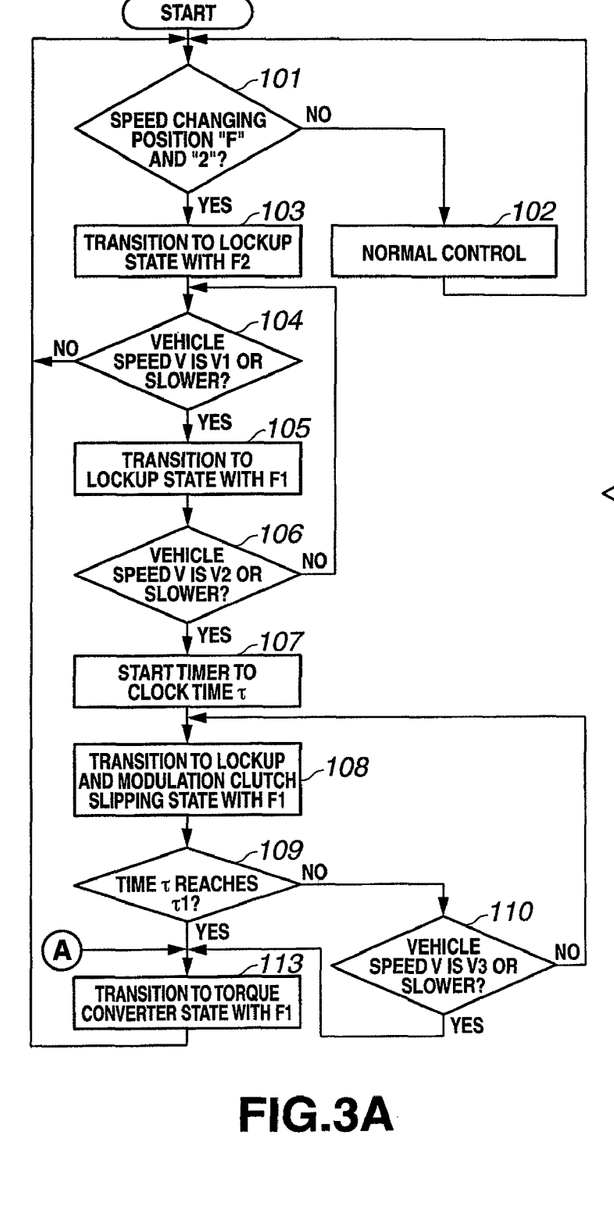
FIG. 3A is a flowchart illustrating a process procedure of a clutch control.

As shown in FIG. 3, controlling means 80 performs a clutch control in which, when a shift range "position of second speed" including a speed stage ("forward F", "second speed") suitable for a work is selected by the speed change operator 70 (step 101), the transition is made, in response to decrease in a vehicle speed V, from a lockup state in which the lockup clutch 40 is engaged while the modulation clutch 20 is engaged (step 105) through a lockup and modulation clutch slipping state in which the modulation clutch 20 slips while the lockup clutch 40 remains engaged (step 108) to a torque converter operation state in which the lockup clutch 40 is released while the modulation clutch 20 is engaged (step 113) (first aspect of invention).

Figure 6A:
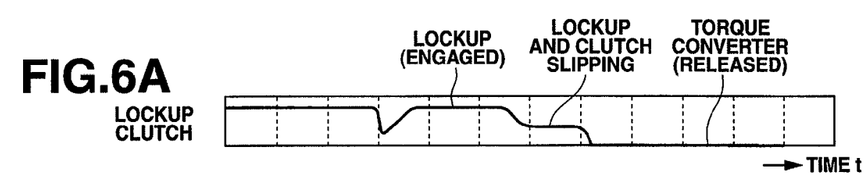
FIGS. 6A, 6B, 6C, 6D, 6E and 6F are graphs illustrating experiment data, and are used for explaining an effect of the embodiment.
Figure 6B:
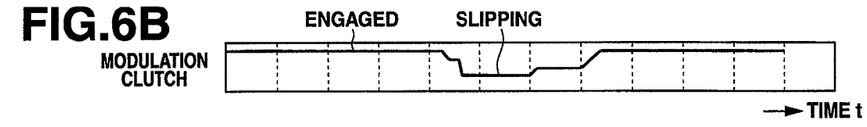
Figure 6C:
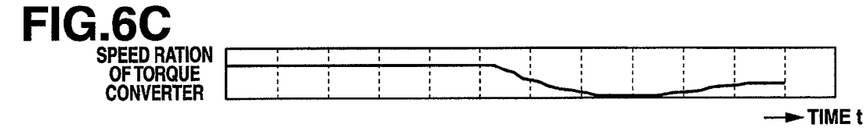
Figure 6D:
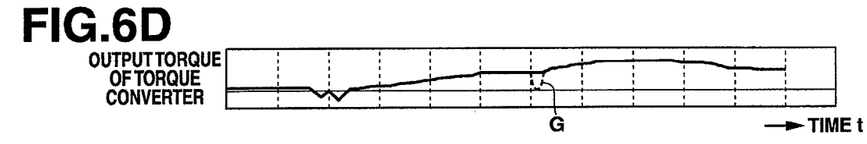
Figure 6E:
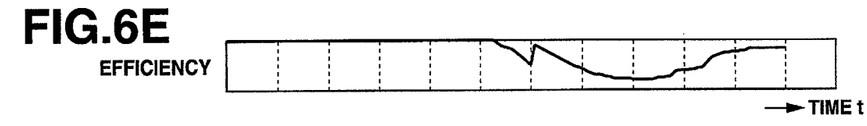
Figure 6F:
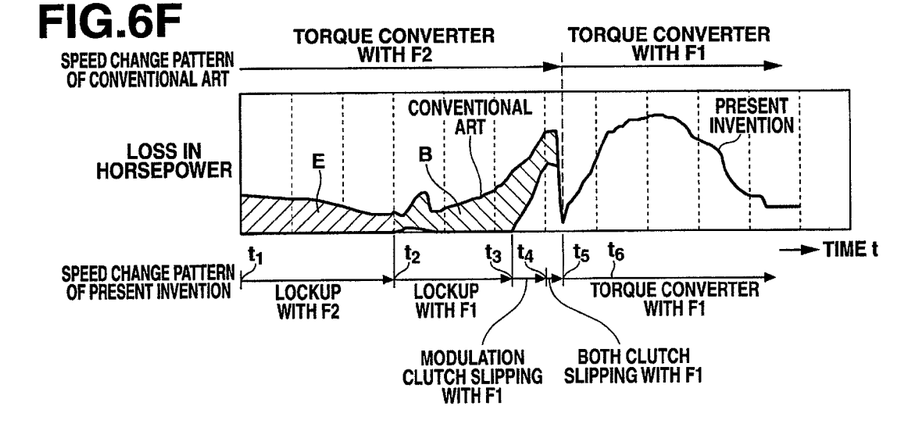

More specifically, when a work is shifted from a state of relatively lower load to a state of relatively heavy load such as heavy excavation and the vehicle speed V gradually decreases accordingly, the transition is made through the lockup state with forward second speed stage F2, the lockup state with forward first speed stage F1, and then the lockup and modulation clutch slipping state with forward first speed stage F1 to the torque converter operation state with the forward first speed stage F1 (FIG. 6F). On the other hand, with the conventional art, when a work is shifted from the state of relatively lower load to the state of relatively heavy load such as heavy excavation and the vehicle speed V gradually decreases accordingly, the transition is made from the torque converter operation state with the forward second speed stage F2 to the torque converter operation state with the forward first speed stage F1 by operating a kickdown switch 73 to be ON (FIG. 6F).

Figure 7:
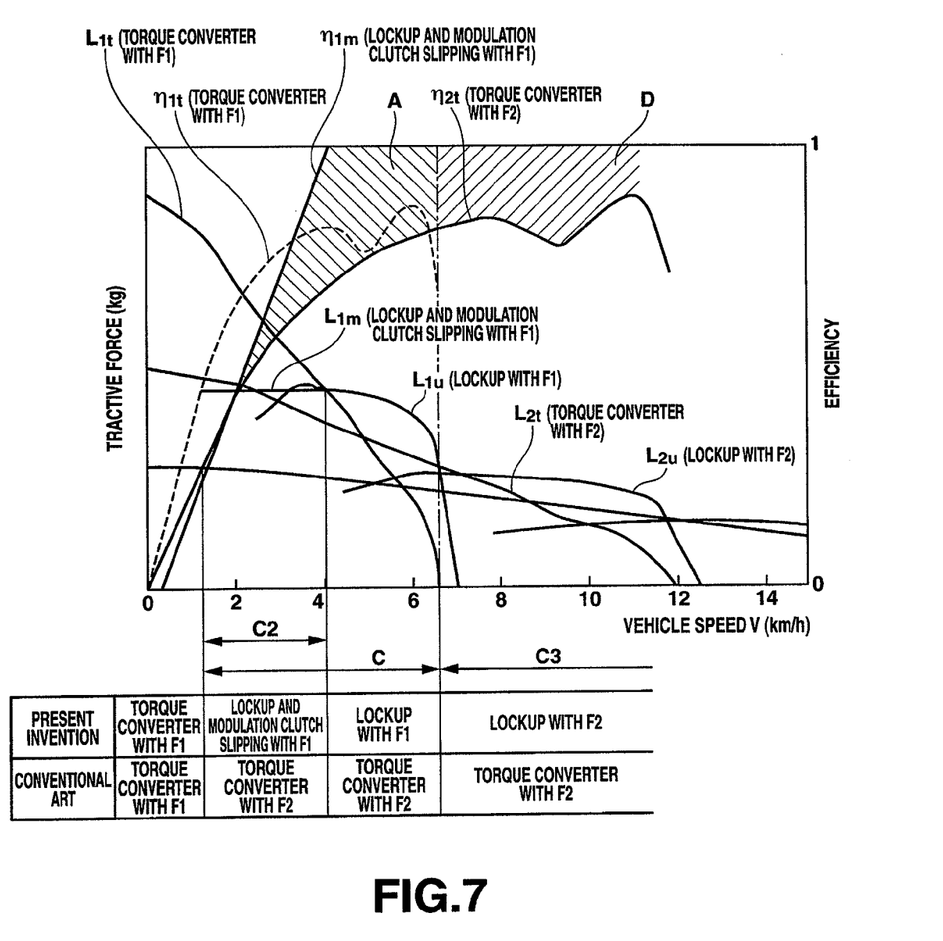
FIG. 7 is a graph illustrating a tractive force performance and efficiency, and is used for explaining an effect of the embodiment.

As shown in FIG. 7, when the present invention is compared with the conventional art, in the same vehicle speed range C, the conventional art is in the torque converter operation state with the forward second speed stage F2, while the present invention is in the lockup state with the forward first speed stage F1. Therefore, in the same vehicle speed range C, efficiency increases by the amount indicated by the diagonally shaded area A. With this increase, as shown in FIG. 6F, a loss in horsepower of the present invention decreases by the amount indicated by the diagonally shaded area B, as compared with the conventional art. As described above, according to the present invention, the amount of fuel consumption can be dramatically reduced as compared with the conventional art.

Meanwhile, when a tractive force performance characteristics L2t of the torque converter operation state with the forward second speed stage F2 of the conventional art is compared with a tractive force performance characteristics L1u of the lockup state with the forward first speed stage F1 and a tractive force performance characteristics L1m of the lockup and modulation clutch slipping state with the forward first speed stage F1 of the present invention, as shown in FIG. 7, the tractive forces (driving forces) are equal in the same vehicle speed range C, and almost the same magnitude of the tractive force as the conventional art can be maintained.

Additionally, in the same lower vehicle speed range C2, while the conventional art is in the torque converter operation state, the present invention is in the lockup state, and hence there is a possibility of the engine stall. However, because the modulation clutch 20 is caused to slip in the vehicle speed range C2, a decrease in the engine speed N associated with a decrease in the vehicle speed V can be suppressed, as shown in an imaginary line F in FIG. 4A. More specifically, the degree of engagement of the modulation clutch 20 is adjusted such that the engine speed N is maintained at a prescribed speed N0 or higher at which the engine does not stall, whereby the modulation clutch 20 is made a slipping state (third aspect of the invention, and fourth aspect of the invention). With this control, it becomes possible to operate with the lockup state in the vehicle speed range C where the conventional art is in the torque converter operation state, and hence, in the vehicle speed range C, which is a lower speed range than that of the conventional art, the lockup state can be maintained without the engine stalling.

As a result, according to the present invention, the working vehicle such as a wheel loader can further reduce the amount of fuel consumption while maintaining the required tractive force, and, realize the speed change without the engine stalling.

Figure 4A:
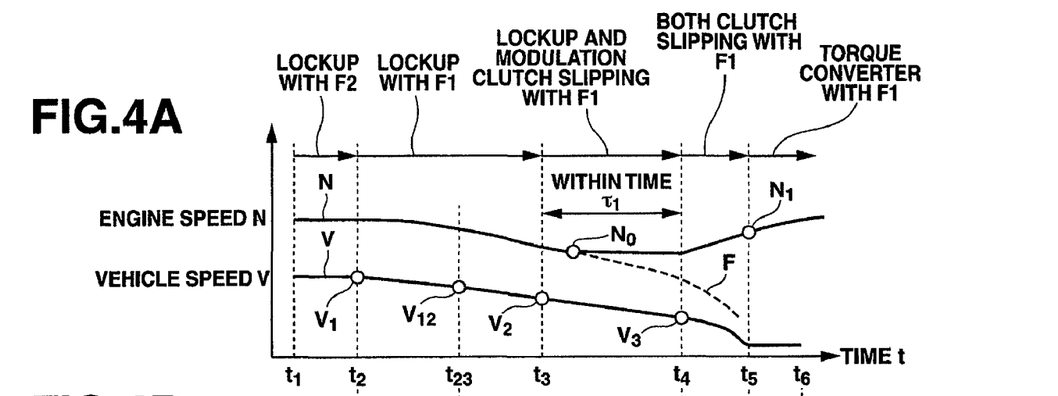
FIGS. 4A, 4B and 4C are graphs for explaining each process of the flowcharts.

However, if the modulation clutch 20 continues to slip for a long period of time, parts constituting the clutch may burn out. Therefore, a limit of time period τ1 for maintaining the lockup and modulation clutch slipping state is set, and control is implemented such that the lockup and modulation clutch slipping state does not continue beyond the set time period τ1 (FIG. 4A).

According to the second aspect of the invention, as shown in FIG. 2, when the shift range "position of second speed" including a speed stage ("forward," "second speed") suitable for a work is selected by the speed change operator 70 (step 101), the controlling means 80 make the transition, in response to the decrease in the vehicle speed V, from the lockup state in which the lockup clutch 40 is engaged while the modulation clutch 20 is engaged (step 105) to the lockup and modulation clutch slipping state in which the modulation clutch 20 slips while the lockup clutch 40 remains engaged (step 108). Then, the controlling means 80 performs, in response to the decrease in the vehicle speed V, a clutch control in which the transition is made to the both clutch slipping state in which the lockup clutch 40 and the modulation clutch 20 slip (step 111), and the transition is further made, through the both clutch slipping state, to the torque converter operation state in which the lockup clutch 40 is released while the modulation clutch 20 is engaged (step 113).

More specifically, when a work is shifted from a state of relatively lower load to a state of relatively heavy load such as heavy excavation and the vehicle speed V gradually decreases accordingly, the transition is made through the lockup state with the forward second speed stage F2, the lockup state with the forward first speed stage F1, the lockup and modulation clutch slipping state with forward first speed stage F1, and then the both clutch slipping state with the forward first speed stage F1 to the torque converter operation state with the forward first speed stage F1 (FIG. 6F).

Effects obtained by making the transition through the both clutch slipping state to the torque converter operation state will be described using FIGS. 4, 5 and 6.

Assuming that the transition is made from the lockup state with the forward first speed stage F1 through the lockup and modulation clutch slipping state with the forward first speed stage F1, directly to the torque converter operation state with the forward first speed stage F1, without passing through the both clutch slipping state with the forward first speed stage F1 (times t4-t5 in FIG. 4), as shown in a broken line G of FIG. 6D, the phenomena of engine torque drop and lack of engine torque occur when the speed change is made in the torque converter 30 from the lockup state to the torque converter operation state, and there is a possibility that uncomfortable feelings and shocks are given to the operator and shocks are applied to the vehicle body. Then, with the second aspect of the present invention, the transition is made to the both clutch slipping state in which the lockup clutch 40 and the modulation clutch 20 slip, before the transition is made to the torque converter operation state. By passing through the both clutch slipping state, the engine speed N is increased to the speed N1 necessary for preventing the occurrence of the phenomena of drop in engine torque or lack of engine torque (time t5 in FIG. 4A, and FIG. 5C), and the occurrence of the phenomenon of drop in the engine torque and the phenomenon of lack of engine torque can be suppressed, whereby the speed change can be smoothly made to the torque converter operation state with the forward first speed stage F1.

The fifth and the sixth aspects of the present invention are inventions in which downshift is forcefully made by the will of the operator at the time of heavy excavation, in order to make the transition to the torque converter operation state with the lowest speed stage, similar to the conventional art.

In the fifth and the sixth aspects of the invention, as shown in FIG. 1, the speed changing operator 70 includes a forward-backward selecting operation lever 71, a speed changing lever 72, and a kickdown switch 73. As shown in FIG. 2, when the forward-backward selecting operation lever 71 and the speed changing lever 72 are operated to be the positions of "forward F" and the "second speed," respectively (step 101), as long as the kickdown switch 72 is not operated to be ON (NO in step 201), the controlling means 80 make the transition, in response to decrease in the vehicle speed V, through the lockup state with the forward second speed stage F2, the lockup state with the forward first speed stage F1, the lockup and modulation clutch slipping state while maintaining the forward first speed stage F1, and then the both clutch slipping state while maintaining the forward first speed stage F1, to the torque converter operation state with the forward first speed stage F1 (step 103, step 105, step 108, step 111, and step 113), as described above.

However, once the kickdown switch 73 is operated to be ON (YES in step 201), the transition is made to the torque converter operation state with the forward first speed stage F1, regardless of the vehicle speed V (step 113).

Therefore, according to the fifth and the sixth aspects of the present invention, similar to the conventional art, strong tractive force can be obtained on the basis of operator's will, when necessary, such as at the time of heavy excavation work.

BEST MODE FOR CARRYING OUT THE INVENTION

Hereinbelow, exemplary embodiments of the present invention will be described with reference to drawings.

FIG. 1 shows blocks illustrating a configuration of a speed change controlling device of a working vehicle of the embodiment, and shows pertinent portion of a configuration of a wheel loader according to the present invention.

As shown in FIG. 1, in a driving force transmission path 90 from the engine 10 of a wheel loader 1 to the wheels (tires) 60, there provided a transfer 2, the modulation clutch 20, the lockup clutch 40 in the torque converter having lockup clutch 35, the torque converter 30 in the torque converter having lockup clutch 35, the transmission 50 having a forward clutch, a backward clutch and respective speed stage clutches, and a reduction gear 3. An output shaft of the engine 10 of the wheel loader 1 is coupled to the transfer 2. The transfer 2 is coupled to the torque converter 30 and the lockup clutch 40 in the torque converter having lockup clutch 35, as well as to a hydraulic pump 9.

Part of an output (torque) of the engine 10 is transmitted to the wheels (tires) 60 through the transfer 2, the modulation clutch 20, the lockup clutch 40 or the torque converter 30 in the torque converter having lockup clutch 35, the transmission 50, and the reduction gear 3. Additionally, the rest of the output of the engine 10 is transmitted to the hydraulic pump 9 through the transfer 2. With this configuration, the hydraulic pump 9 is driven, and the pressure oil discharged from the hydraulic pump 9 is delivered to a hydraulic actuator 1c through an operation valve 1b, whereby the work equipment 1a, etc. is operated.

The modulation clutch 20 is disposed between the engine 10 and the torque converter 30, and is provided for changing the degree of engagement between the input side and the output side to vary the output transmitted from the engine 10 to the torque converter 30. The modulation clutch 20 is formed by a wet-type multiple-disc hydraulic clutch, and the hydraulic clutch performs engagement operation (connection operation) or releasing operation (disconnection operation) by changing the amount of hydraulic pressure. In this embodiment, the modulation clutch 20 performs the engagement operation when the hydraulic pressure supplied to the modulation clutch 20 becomes large, and performs the releasing operation when the hydraulic pressure becomes small.

The torque converter 30 in the torque converter having lockup clutch 35 is disposed between the modulation clutch 20 and the transmission 50.

The lockup clutch 40 in the torque converter having the lockup clutch 35 is disposed between the modulation clutch 20 and the transmission 50, and is provided in parallel to the torque converter 30. The lockup clutch 40 is formed by a wet-type multiple-disc hydraulic clutch, and the hydraulic clutch performs engagement operation (connection operation) or releasing operation (disconnection operation) by changing the amount of hydraulic pressure. In this embodiment, the lockup clutch 40 performs the engagement operation when the hydraulic pressure supplied to the lockup clutch 40 becomes large, and performs the releasing operation when the hydraulic pressure becomes small.

The transmission 50 has a forward clutch 55 corresponding to a forward travel stage F, a backward clutch 56 corresponding to a backward travel stage R, and speed stage clutches corresponding to respective speed stages. That is, the transmission 50 has a first speed clutch 51, a second speed clutch 52, a third speed clutch 53, and a fourth speed clutch 54 corresponding to a first speed stage, a second speed stage, a third speed stage, and a fourth speed stage, respectively. Each of the clutches is formed by a wet-type multiple-plate hydraulic clutch. The transmission 50 let the forward clutch 55, the backward clutch 56, and respective speed stage clutches 51-54 selectively perform engagement operation or releasing operation in accordance with a direction to be advanced, a driving force required, or a speed (vehicle speed) required.

By controlling the hydraulic pressure of pressure oil supplied to each of the clutches 51-56 of the transmission 50 or discharged from each of the clutches 51-56, the friction engagement force of the input side and the output side of each of the clutches 51-56 of the transmission 50 is controlled. Similarly, by controlling the hydraulic pressure (hereinafter, referred to as lockup clutch pressure) of pressure oil supplied to the lockup clutch 40 or discharged from the lockup clutch 40, the friction engagement force of the input side and the output side of the lockup clutch 40 is controlled. Similarly, by controlling the hydraulic pressure (hereinafter, referred to as modulation clutch pressure) of pressure oil supplied to the modulation clutch 20 or discharged from the modulation clutch 20, the friction engagement force of the input side and the output side of the modulation clutch 20 is controlled.

A controller 80 controls the engagement operation and the releasing operation of each of the clutches 51-56 of the transmission 50, the lockup clutch 40, and the modulation clutch 20.

A cab of the wheel loader 1 is provided with the speed change operator 70. The speed changing operator 70 includes the forward-backward selecting operation lever 71, the speed changing lever 72, the kickdown switch 73, and a lockup switch 5.

By operating the forward-backward selecting operation lever 71 and the speed changing lever 72, a shift range including respective speed stages of a forward drive (F), a backward drive (R), a first speed, a second speed, a third speed, and a fourth speed can be selected.

By using the forward-backward selecting operation lever 71, the forward travel stage (forward clutch 55) or the backward travel stage (backward clutch 56) are selected in accordance with an operation position. A forward-backward position signal indicating the operation position (forward position "F," backward position "R") of the forward-backward selecting operation lever 71 is inputted to the controller 80.

A shift range, which is a speed changing range of speed stage, is selected in accordance with the operation position of the speed changing lever 72. The selectable position of the speed changing lever 72 includes, for example, a shift range "first speed," a shift range "second speed," a shift range "third speed," and a shift range "fourth speed." At the shift range "second speed," downshift is implemented to the first speed stage only in a case when the forward-backward position is in the forward position "F" and the kickdown switch 73 is operated to be ON. In other case, the position is fixed to the second speed stage, and the shift range "second speed" is a position of a low speed shift range. At the shift range "second speed," the highest speed stage is the second speed stage. A shift range signal indicating the operation position (shift ranges "first speed," "second speed," "third speed," and "fourth speed") of the speed changing lever 72 is inputted to the controller 80. During the low speed operation such as the V-shaped operation in which the forward and backward changes are complicatedly made, the speed changing lever 72 is usually operated to be the shift range "second speed."

The controller 80 controls pressure oil supplied to the clutch so as to selectively engage, in the transmission 50, the clutches that correspond to the position selected at the forward-backward selecting operation lever 71 and the speed changing lever 72.

When the forward-backward selecting operation lever 71 and the speed changing lever 72 are operated to be the positions of the "forward F" and the "second speed," respectively, the controller 80 controls such that the forward clutch 55 and the second speed stage clutch 52 are selectively engaged in the transmission 50. The engagement is fixed to this forward second speed stage F2, as long as the forward-backward selecting operation lever 71 and the speed changing lever 72 are not operated to be other position or kickdown switch 73 is not operated to be ON. Control of an automatic speed change at the time when the shift range "second speed" is selected will be described later.

The kickdown switch 73 is provided to an operation lever for work equipment. Once the kickdown switch 73 is operated to be ON, an operation signal indicating the ON-operation is inputted to the controller 80. When the forward-backward selecting operation lever 71 and the speed changing lever 72 are operated to be the positions of the "forward F" and the "second speed," respectively, if the signal indicating that the kickdown switch 73 is operated to be ON is inputted, the controller 80 controls such that the forward clutch 55 and the first speed stage 51 are selectively engaged in the transmission 50 while the state becomes the torque converter operation state. As a result, the downshift is made to the forward first speed stage F1, and larger driving force (tractive force) can be obtained at the wheels 60.

The cab of the wheel loader 1 is provided with a lockup clutch switch 5 for operating the lockup clutch 40 to be ON (engagement operation) or OFF (releasing operation). An operation signal of the lockup clutch switch 5 is inputted to the controller 80.

At the time of the normal control, other than at the time of a clutch control operation, which will be described later, the controller 80 controls the lockup clutch 40 in accordance with the operation signal of the lockup clutch switch 5. In other words, when contents of the operation signal of the lockup clutch switch 5 are OFF, the controller 80 controls the lockup clutch 40 so as to become the releasing operation. When the contents of the operation signal of the lockup clutch 5 are ON, the controller 80 controls the lockup clutch 40 so as to become the engagement operation.

The lockup clutch switch 5 is a switch used for disabling the lockup and traveling in the torque converter operation state at all the time. During the clutch control operation, the controller 80 automatically controls the engagement operation and the releasing operation of the lockup clutch 40 in accordance with a procedure of the clutch control, regardless of the contents of the operation signal of the lockup clutch switch 5.

The cab of the wheel loader 1 is provided with an inching pedal 4 for adjusting the degree of engagement of the modulation clutch 20. A signal indicating the operation amount of the inching pedal 4 is inputted to the controller 80.

At the time of the normal control, other than at the time of the clutch control operation, which will be described later, the controller 80 controls the modulation clutch 20 in response to the operation amount of the inching pedal 4. In other words, the controller 80 controls the modulation clutch 20 such that the degree of engagement corresponding to the operation amount of the inching pedal 4 can be obtained.

At the time of the clutch control operation, the controller 80 controls the engagement operation and the releasing operation of the modulation clutch 20 in accordance with a procedure of the clutch control. However, for safety reasons, if the inching pedal 4 is operated, the operation of the inching pedal 4 is given a higher priority than the clutch control.

An output shaft of the transmission 50 is provided with a vehicle speed sensor 6 for detecting a rotation number Nt of the output shaft of the transmission. A signal indicating the rotation number Nt detected by the vehicle speed sensor 6 is inputted to the controller 80. The controller 80 converts the inputted rotation number Nt of the output shaft of the transmission into a speed of the vehicle (hereinafter, referred to as vehicle speed) V of the wheel loader 1.

The cab of the wheel loader 1 is provided with an accelerator pedal 7. The accelerator pedal 7 is depressed by the operator, and a signal indicating a throttle amount, which is the depressed amount of the accelerator pedal 7, is inputted to the controller 80.

The controller 80 controls the engine 10 such that a target speed corresponding to the throttle amount can be obtained. The engine is a diesel engine, and the engine output is controlled by adjusting the amount of a fuel injected into a cylinder. This adjustment is made by controlling a governor provided to a fuel injection pump of the engine 10. In general, as this governor, a governor of all speed control type is used, and adjusts the engine speed as well as the amount of fuel injection in accordance with a load so as to obtain the target speed corresponding to the throttle amount. In other words, the governor increases or decreases the amount of fuel injection so as to eliminate the difference between the target speed and the actual engine speed.

The engine 10 is provided with an engine speed sensor 8 for detecting the actual speed N of the engine 10. A signal indicating the speed N detected by the engine speed sensor 8 is inputted to the controller 80.

First Clutch Control Example

Figure 2A:
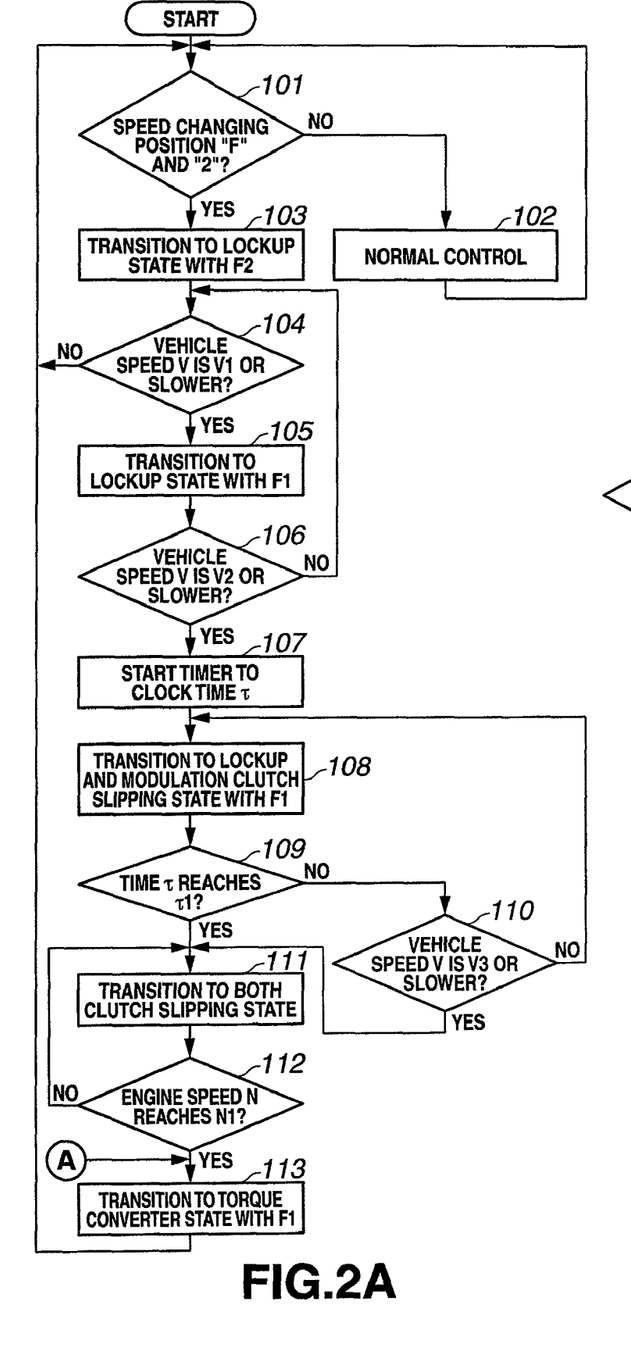
FIG. 2A is a flowchart illustrating a process procedure of a clutch control.
Figure 2B:
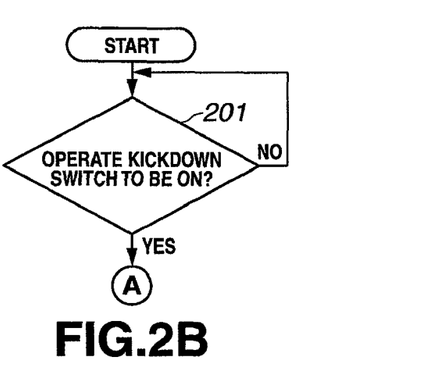

FIG. 2 shows flowcharts illustrating procedures of processes implemented by the controller 80. FIG. 2A is a flowchart illustrating a process procedure of the clutch control, and, FIG. 2B is a flowchart illustrating a process procedure of a control when the kickdown switch 73 is operated to be ON. Processes in FIGS. 2A and 2B are coexistently implemented.

FIG. 4A is a graph showing a time variation of the engine speed N and the vehicle speed V, in which the horizontal axis represents time t while the vertical axis represents the engine speed N and the vehicle speed V.

Figure 4B:
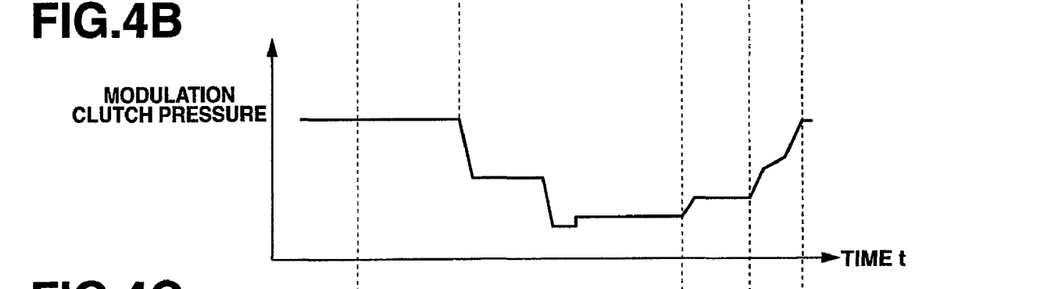

FIG. 4B is a graph showing a time variation of a modulation clutch pressure, in which the horizontal axis represents time t while the vertical axis represents the modulation clutch pressure.

Figure 4C:
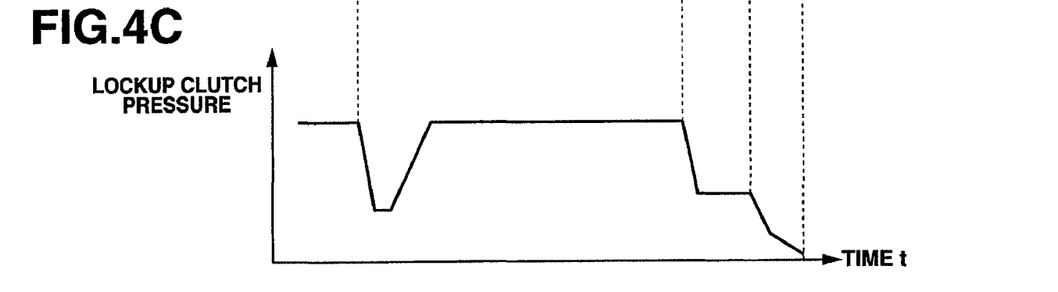

FIG. 4C is a graph showing a time variation of a lockup clutch pressure, in which the horizontal axis represents time t while the vertical axis represents the lockup clutch pressure. The time axes in FIGS. 4A, 4B, and 4C are common to each other.

Hereinafter, description will be given with reference to FIGS. 2 and 4.

The controller 80 first determines whether the forward-backward selecting operation lever 71 and the speed changing lever 72 are operated to be the positions of "forward F" and the "second speed," respectively (step 101).

As a result, when it is determined that the forward-backward selecting operation lever 71 and the speed changing lever 72 are operated to be the positions other than "forward F" and the "second speed," respectively (NO in step 101), process proceeds to the normal control (step 102), and the process after the clutch control step 103 is not implemented.

On the other hand, when it is determined that the forward-backward selecting operation lever 71 and the speed changing lever 72 are operated to be the positions of "forward F" and the "second speed," respectively (YES in step 101), the normal control (step 102) is not implemented, and the clutch control step 103 and the following steps are implemented.

In other words, the controller 80 controls such that, at the time t1, the forward clutch 55 and the second speed stage clutch 52 are selectively engaged in the transmission 50. At the same time, the controller 80 controls the modulation clutch 20 and the lockup clutch 40 so as to become the lockup state in which the modulation clutch 20 is engaged while the lockup clutch is engaged. As a result, the transition is made to the lockup state with the forward second speed stage F2 (step 103; times t1-t2 in FIGS. 4A, 4B, and 4C).

Next, it is determined whether or not the current vehicle speed V is a threshold value V1 or lower (step 104).

When the current vehicle speed V is not the threshold value V1 or lower (NO in step 104), the lockup state with the forward second speed stage F2 is maintained. However, when the current vehicle speed V becomes the threshold value V1 or lower (YES in step 104), the controller 80 controls such that the forward clutch 55 and the first speed stage clutch 51 are selectively engaged in the transmission 50. At the same time, the controller 80 controls the modulation clutch 20 and the lockup clutch 40 so as to maintain the lockup state in which the modulation clutch 20 is engaged while the lockup clutch 40 is engaged. As a result, the transition (speed change) is made to the lockup state with the forward first speed stage F1 (step 105; times t2-t3 in FIGS. 4A, 4B, and 4C).

Next, it is determined whether or not the current vehicle speed V is a threshold value V2 or lower (step 106), the value V2 being set lower than the threshold value V1 above.

When the current vehicle speed V is not the threshold value V2 or lower (NO in step 106), the lockup state with the forward first speed stage F1 is maintained. However, when the current vehicle speed V becomes the threshold value V2 or lower (YES in step 106), the controller 80 starts a timer that clocks a time τ (step 107; time t3 in FIGS. 4A, 4B, and 4C), and makes the transition to the lockup and modulation clutch slipping state in which the modulation clutch 20 slips while the lockup clutch 40 remains engaged. Specifically, a modulation clutch slipping control is implemented in which the degree of engagement of the modulation clutch 20 is adjusted such that the engine speed N is maintained at a prescribed speed N0 or higher at which the engine does not stall, and the modulation clutch 20 is made the slipping state. For example, the actual speed N of the engine 10 is fed back from the engine speed sensor 8, and the modulation clutch pressure is adjusted such that the difference between the target speed N0 and the actual speed N becomes zero (times t3-t4). However, in the embodiment, as shown in FIG. 4B, preparation for the modulation clutch slipping control is implemented between the times t23 and t3 in FIG. 4B, by implementing a process in which the modulation clutch pressure is reduced to a prescribed pressure in advance at the time when the vehicle speed V reaches a threshold value V12 (>V2) (time t23 in FIG. 4B) (step 108).

If the modulation clutch slipping control above is implemented and the modulation clutch 20 continues to slip for a long period of time, parts constituting the clutch may burn out. Therefore, a limit of time τ1 for maintaining the lockup and modulation clutch slipping state is set, and control is implemented such that the lockup and modulation clutch slipping state does not continue beyond the set time τ1 (step 109).

Additionally, at the time of the speed change from the lockup state to the torque converter operation state in the torque converter 30, there is a possibility that phenomena of drop in engine torque and lack of engine torque occur. Thus, to prevent these phenomena, the transition is made to the torque converter operation state (step 113), after the transition is made to a both clutch slipping state (step 111) in which both of the lockup clutch 40 and the modulation clutch 20 slip.

For this reason, it is determined whether or not the time τ measured by the timer reaches the set time τ1 (step 109). Then, it is determined whether or not the current vehicle speed V is a threshold value V3 or lower, the value 3 being set lower than the value V2 above (step 110).

As a result, when the time τ measured by the timer does not reach the set time period τ1 (NO in step 109), and the current vehicle speed V is not the threshold value V3 or lower (NO in step 110), the lockup and modulation clutch slipping state (step 108) is maintained. However, when the time τ measured by the timer reaches the set time τ1 (YES in step 109), or the current vehicle speed V becomes the threshold value V3 or lower (YES in step 110), the transition is made to the both clutch slipping state. In other words, the controller 80 implements a both clutch slipping control in which the degree of engagement of the lockup clutch 40 and the modulation clutch 20 is adjusted such that the engine speed N is increased to the speed N1 necessary for preventing the occurrence of the phenomena of drop in engine torque or lack of engine torque, whereby the lockup clutch 40 and the modulation clutch 20 are caused to become the both clutch slipping state. The both clutch slipping control is implemented such that the lockup clutch 40 is gradually slipped until the engine speed N returns to the necessary speed N1 while the modulation clutch 20 is maintained in the slipping state until the engine speed N returns to the necessary speed N1 (step 111; times t4-t5 in FIGS. 4A, 4B, and 4C).

At the time when the engine speed N is increased to the threshold value N1 as described above (YES in step 112), the controller 80 causes the modulation clutch 20 to be engaged, and at the same time, causes the lockup clutch 40 to be released (time t5 in FIGS. 4A, 4B, and 4C). With this operation, the modulation clutch pressure gradually increases and the lockup clutch pressure gradually decreases, and the state becomes the torque converter operation state in which the lockup clutch 40 is released while the modulation clutch 20 is engaged. As a result, the transition is made to the torque converter operation state with the forward first speed stage F1 (step 113; time t6 in FIGS. 4A, 4B, and 4C).

At all times during the process shown in FIG. 2A being implemented, it is determined whether or not the kickdown switch 73 is operated to be ON, as shown in FIG. 2B (step 201).

When the forward-backward selecting operation lever 71 and the speed changing lever 72 are operated to be the positions of "forward F" and the "second speed," respectively (step 101), as long as the kickdown switch 73 is not operated to the ON (NO in step 201), as described above, the transition is made, in response to decrease in the vehicle speed V, through the lockup state with the forward second speed stage F2, the lockup state with the forward first speed stage F1, the lockup and modulation clutch slipping state while maintaining the forward first speed stage F1, and then the both clutch slipping state while maintaining the forward first speed stage F1, to the torque converter operation state with the forward first speed stage F1 (step 103, step 105, step 108, step 111, and step 113).

However, once the kickdown switch 73 is operated to be ON (YES in step 201), the transition is made to the torque converter operation state with the forward first speed stage F1 regardless of the vehicle speed V (step 113).

Therefore, similar to the conventional art, when necessary such as at the time of heavy excavation work, a strong tractive force can be obtained on the basis of operator's will.

Next, an effect of the first clutch control example described above will be described by using a conventional art as a comparative example.

FIGS. 5 and 6 are graphs showing experiment data.

FIGS. 5A-5D and FIGS. 6A-6E are diagrams showing data according to this embodiment, showing a time variation of each parameter, in which, when traveling with the forward second speed stage F2, the vehicle speed gradually decreases due to a load; the kickdown switch 73 is operated to be ON at a prescribed timing; and, then the state is switched to the torque converter operation state with F1. Note that FIGS. 5A-5D and FIGS. 6A-6E can also be deemed to be data at the time when the speed change is automatically made to the torque converter operation state with F1 in response to decrease in the vehicle speed, without operating the kickdown switch 73 to be ON. FIG. 6F is a diagram in which data of this embodiment is compared with data of the conventional art.

Figure 5A:
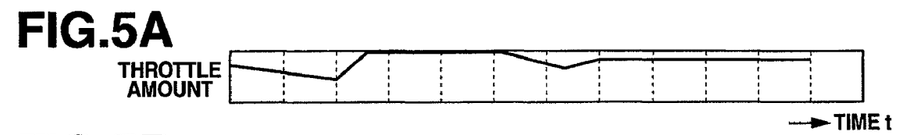
FIGS. 5A, 5B, 5C and 5D are graphs illustrating experiment data, and are used for explaining an effect of the embodiment.
Figure 5B:
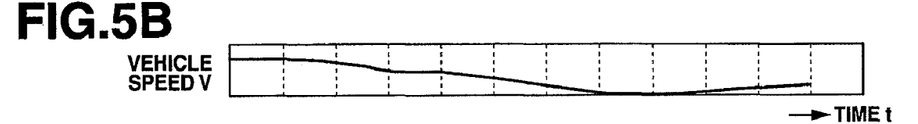
Figure 5C:
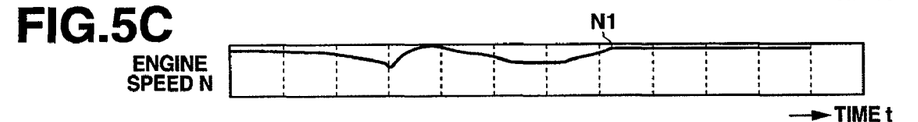
Figure 5D:
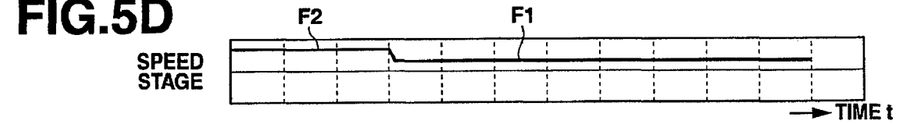

FIG. 5A shows a time variation of the throttle amount of the accelerator pedal 7; FIG. 5B shows a time variation of the vehicle speed V; FIG. 5C shows a time variation of the speed N of the engine 10; and, FIG. 5D shows a time variation of a speed stage.

FIG. 6A shows a time variation of the lockup clutch pressure; FIG. 6B shows a time variation of the modulation clutch pressure; FIG. 6C shows a time variation of a change gear ratio of the torque converter 30; FIG. 6D shows a time variation of an output shaft torque of the torque converter 30; FIG. 6E shows a time variation of efficiency of the driving force transmission path 90 (hereinafter, efficiency); and, FIG. 6F shows a time variation of a loss in horsepower.

The time axes of graphs in FIGS. 5 and 6 are common to each other.

FIG. 6F shows a speed change pattern of this embodiment and a speed change pattern of the conventional art.

As shown in FIG. 6F, in this embodiment, when a work is shifted from a state of relatively lower load to a state of relatively heavy load such as heavy excavation and the vehicle speed V gradually decreases accordingly, the transition is made through the lockup state with the forward second speed stage F2 (times t1-t2), the lockup state with the forward first speed stage F1 (times t2-t3), the lockup and modulation clutch slipping state with the forward first speed stage F1 (times t3-t4), and then the both clutch slipping state with the forward first speed stage F1 (times t4-t5), to the torque converter operation state with the forward first speed stage F1 (times t5-t6-) (FIG. 6F).

On the other hand, with the conventional art, even when a work is shifted from the state of relatively lower load to the state of relatively heavy load such as heavy excavation and the vehicle speed V gradually decreases accordingly, the torque converter operation state with the forward second speed stage F2 is maintained. However, if the work becomes heavy load at the same timing as this embodiment and the kickdown switch 73 is operated to be ON, the transition is made to the torque converter operation state with the forward first speed stage F1 at the time t5, which is the same time t5 as this embodiment (FIG. 6F).

FIG. 7 is a graph illustrating a tractive force performance and efficiency, in which the horizontal axis represents the vehicle speed V. In FIG. 7, L1$u$ represents the tractive force performance characteristic of the lockup state with the forward first speed stage F1; L1$t$ represents the tractive force performance characteristic of the torque converter operation state with the forward first speed stage F1; L2$u$ represents the tractive force performance characteristic of the lockup state with the forward second speed stage F2; and, L2$t$ represents the tractive force performance characteristic of the torque converter operation state with the forward second speed stage F2. Additionally, L1$m$ represents the tractive force performance characteristic of the lockup and modulation clutch slipping state with the forward first speed stage F1.

$\eta 2t$ represents the efficiency in the torque converter operation state with the forward second speed stage F2, and, $\eta 1t$ represents the efficiency in the torque converter operation state with the forward first speed stage F1. Additionally, $\eta 1m$ represents the efficiency in the lockup and modulation clutch slipping state with the forward first speed stage F1. Note that the efficiency in the lockup state with the forward first speed stage F1 and the efficiency in the lockup state with the forward second speed stage F2 are 1.

As shown in FIG. 7, when this embodiment is compared with the conventional art, in the same vehicle speed range C, the conventional art is in the torque converter operation state with the forward second speed stage F2 while this embodiment is in the lockup state with the forward first speed stage F1. Therefore, in the same vehicle speed range C, the efficiency increases by the amount indicated by the diagonally shaded area A. With this increase, as shown in FIG. 6F, a loss in horsepower of this embodiment decreases by the amount indicated by the diagonally shaded area B, as compared with the conventional art. Furthermore, as shown in FIG. 7, in the vehicle speed range C3 where the conventional art is in the torque converter operation state with the forward second speed stage F2, this embodiment is in the lockup state with the forward second speed stage F2. As a result, in the same vehicle speed range C3, the efficiency increases by the amount indicated by the diagonally shaded area D. Therefore, as shown in FIG. 6F, according to this embodiment, the loss in horsepower decreases by the amount indicated by the diagonally shaded area E, as compared with the conventional art.

As described above, according to this embodiment, the amount of fuel consumption can be dramatically reduced as compared with the conventional art.

Meanwhile, when the tractive force performance characteristic L2$t$ of the torque converter operation state with the forward second speed stage F2 of the conventional art is compared with the tractive force performance characteristic L1$u$ of the lockup state with the forward first speed stage F1 and the tractive force performance characteristic L1$m$ of the lockup and modulation clutch slipping state with the forward first speed stage F1 of this embodiment, in the same vehicle speed range C, the tractive forces (driving force) are equal, and almost the same degree of the tractive force as the conventional art can be obtained.

Additionally, in the same vehicle speed range C2, while the conventional art is in the torque converter operation state, this embodiment is in the lockup state, and there is a possibility of the engine stall. However, because the modulation clutch 20 is caused to slip in the vehicle speed range C2, the decrease in the engine speed N associated with the decrease in the vehicle speed V can be suppressed, as shown in an imaginary line F in FIG. 4A. For this reason, in the vehicle speed range C where control is made in the torque converter operation state in the conventional art, it becomes possible to operate in the lockup state, and hence, even in a lower range than the conventional art, that is, in the vehicle speed range C, the lockup state can be maintained without the engine stalling.

As a result, according to this embodiment, the wheel loader 1 can further reduce the amount of fuel consumption while maintaining the required tractive force, and, realize the speed change without the engine stalling.

Incidentally, assuming that the transition is made from the lockup state with the forward first speed stage F1 through the lockup and modulation clutch slipping state with the forward first speed stage F1, directly to the torque converter operation state with the forward first speed stage F1, without passing through the both clutch slipping state with the forward first speed stage F1 (times t4-t5), as shown in a broken line G of FIG. 6D, the phenomena of engine torque drop and lack of engine torque occur when the speed change is made from the lockup state in the torque converter 30 to the torque converter operation state, which may lead to a situation where uncomfortable feelings and shocks are given to the operator and shocks are applied to the vehicle body. For this reason, according to this embodiment, after the transition is made to the both clutch slipping state in which the lockup clutch 40 and the modulation clutch 20 are slipping, the state is shifted to the torque converter operation state. By passing through this both clutch slipping state, as shown in FIG. 5C or 4A, the engine speed N increases to the speed N1 necessary for preventing the occurrence of the phenomena of drop in the engine torque and lack of the engine torque, and the occurrence of the phenomena of drop in the engine torque and lack of engine torque can be suppressed, whereby the speed change can be smoothly made to the torque converter operation state with the forward first speed stage F1.

Note that, in the control according to this embodiment as described above, as shown in FIG. 7, the vehicle speed at an intersection of the characteristic L2$u$ at the time of F2 lockup and the characteristic L2$t$ at the time of F2 torque converter and the vehicle speed at an intersection of the characteristic L2$u$ at the time of F2 lockup and the characteristic L1$u$ at the time of F1 lockup are almost the same. Therefore, the control is made such that the downshift is made from the F2 lockup state to the F1 lockup state, without passing through the F2 torque converter operation state (steps 103 and 105 in FIG. 2). However, in a case when the vehicle speeds at the respective intersections are significantly different, it may be possible to rewrite the control algorithm in FIG. 2 and implement a control such that the downshift is made from the F2 lockup state through the F2 torque converter operation state to the F1 lockup state.

Second Clutch Control Example

In the aforementioned first clutch control example, the transition is made through the both clutch slipping state with the forward first speed stage F1 (times t4-t5) to the torque converter operation state with the forward first speed stage F1 (times t5-t6-).

However, it may be possible to make the transition directly to the torque converter operation state with the forward first speed stage F1 through the lockup and modulation clutch slipping state with the forward first speed stage F1, without passing through the both clutch slipping state with the forward first speed stage F1.

FIG. 3 shows flowcharts illustrating the procedures of processes implemented by the controller 80. As compared with FIG. 2, the steps 111, 112, which relate to the both clutch slipping state with the forward first speed stage F1, are omitted.

According to the control of this embodiment, when a work is shifted from the state of relatively lower load to the state of relatively heavy load such as heavy excavation and the vehicle speed V gradually decreases accordingly, the transition is made through the lockup state with the forward second speed stage F2 (step 103), the lockup state with the forward first speed stage F1 (step 105), and then the lockup and modulation clutch slipping state with the forward first speed stage F1 (step 108), to the torque converter operation state with the forward first speed stage F1 (step 113).

Therefore, according this embodiment, similar to the aforementioned first clutch control example, effects of further reducing the amount of fuel consumption while maintaining the required tractive force, and realizing the speed change without the engine stalling can be achieved in the wheel loader 1.

However, when the speed change is made from the lockup state to the torque converter operation state in the torque converter 30, there is a possibility that the phenomena of engine torque drop and lack of engine torque occur, and hence, uncomfortable feelings and shocks are given to the operator and shocks are applied to the vehicle body. For this reason, it is desirable to control the engine torque to suppress the drop in the engine torque as well as lack of engine torque by using an alternative control in place of the both clutch slipping control implemented in the first control example, such as a control of momentarily increasing the torque of the engine 10 when the speed change is made from the lockup state to the torque converter operation state in the torque converter 30.

Additionally, with the embodiments as described above, when it is determined that the forward-backward selecting operation lever 71 and the speed changing lever 72 are operated to be the positions of "forward F" and the "second speed," respectively (YES in step 101), the clutch control of step 103 or step 113 is implemented. However, the selected position of the speed stage for implementing the clutch control may be changed, as needed, in accordance with the type of the working vehicle or type of work. For example, it may be possible to, when it is determined that the position is operated to be the "forward F" and the "first speed," implement a clutch control in which the transition is made through the lockup state with the forward first speed stage F1, and then the lockup and modulation clutch slipping state with the forward first speed stage F1 to the torque converter operation state with the forward first speed stage F1. Additionally, it may be possible to, when it is determined that the position is operated to be the positions of "forward F" and the "third speed," implement a clutch control in which the transition is made through the lockup state with a forward third speed stage F3, the lockup state with the forward second speed stage F2, the lockup state with the forward first speed stage F1, and then the lockup and modulation clutch slipping state with the forward first speed stage F1 to the torque converter operation state with the forward first speed stage F1. Needless to say, in such cases, it may be possible to make the transition through the both clutch slipping state with the forward first speed stage F1 to the torque converter operation state with the forward first speed stage F1.

In short, with the present invention, any speed stage position can be selected, as long as the clutch control can be implemented when a speed stage suitable for a work is selected by the speed changing operator 70.

Additionally, in the embodiments described above, the speed changing pattern in which the transition is made from the lockup state with the forward second speed stage F2 to the lockup state with the forward first speed stage F1 is employed (steps 103 and 105). However, it may be possible to employ a speed changing pattern in which the transition is made from the torque converter operation state with the forward second speed stage F2 to the lockup state with the forward first speed stage F1.

Figure 3B:
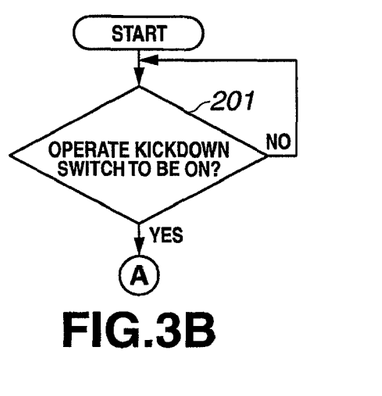

Additionally, in the embodiments described above, during the clutch control operation, once the kickdown switch 73 is operated to be ON (YES in step 201), the speed change is forcefully made to the torque converter operation with the forward first speed stage F1 (step 113), regardless of the vehicle speed V. However, it may be possible to implement an operation without forcefully making the speed change. In such case, the processes shown in FIG. 2B and FIG. 3B are omitted, and the speed change is made in accordance with the process procedures shown in FIG. 2A and FIG. 3A, regardless of the operation of the kickdown switch 73.

Additionally, the embodiments have been described by assuming a wheel loader as a working vehicle. However, the present invention is similarly applicable to a forklift, a bulldozer or other working vehicle, provided that the working vehicle has the modulation clutch, the torque converter, the lockup clutch and the transmission.

BRIEF DESCRIPTION OF THE DRAWINGS

FIG. 2 shows diagrams for explaining a first clutch control example, and flowcharts illustrating procedures of processes implemented by a controller 80. FIG. 2B is a flowchart illustrating a process procedure of a control in response to operation of a kickdown switch to be ON.

FIG. 3 shows diagrams for explaining a second clutch control example, and flowcharts illustrating procedures of processes implemented by the controller. FIG. 3B is a flowchart illustrating a process procedure of a control in response to operation of the kickdown switch to be ON.

The invention claimed is:

1. A speed change control device of a working vehicle, in which a power of an engine is transmitted as a driving force to wheels through a modulation clutch, a torque converter having a lockup clutch, and a transmission, comprising:

a speed change operator; and, a controller that controls at least the modulation clutch and the lockup clutch of the torque converter having the lockup clutch, wherein the controller performs a clutch control so as to:

cause a lockup state in which the modulation clutch is engaged while the lockup clutch is engaged, when a vehicle speed becomes a first vehicle speed or lower;

cause a lockup and modulation clutch slipping state in which the modulation clutch slips while the lockup clutch remains engaged, when the vehicle speed becomes a second vehicle speed or lower, the second vehicle speed being lower than the first vehicle speed; and cause a torque converter operation state in which the modulation clutch is engaged while the lockup clutch is released, when the lockup and modulation clutch slipping state continues for a prescribed period of time or longer, or when the vehicle speed becomes a third vehicle speed or lower, the third vehicle speed being lower than the second vehicle speed.

2. A speed change control device of a working vehicle, in which a power of an engine is transmitted as a driving force to wheels through a modulation clutch, a torque converter having a lockup clutch, and a transmission, comprising:

a speed change operator; and, a controller that controls at least the modulation clutch and the lockup clutch of the torque converter having the lockup clutch, wherein the controller performs a clutch control so as to:

cause a lockup state in which the modulation clutch is engaged while the lockup clutch is engaged, when a vehicle speed becomes a first vehicle speed or lower;

cause a lockup and modulation clutch slipping state in which the modulation clutch slips while the lockup clutch remains engaged, when the vehicle speed becomes a second vehicle speed or lower, the second vehicle speed being lower than the first vehicle speed;

cause a both clutch slipping state in which both the lockup clutch and the modulation clutch slip, when the lockup and modulation clutch slipping state continues for a prescribed period of time or longer or when the vehicle speed becomes a third vehicle speed or lower, the third vehicle speed being lower than the second vehicle speed; and, cause a torque converter operation state in which the modulation clutch is engaged while the lockup clutch is released, when the state is in the both clutch slipping state and an engine speed is a prescribed speed or lower.

3. The speed change control device of a working vehicle according to claim 1, wherein the controller performs a control in which, in the lockup and modulation clutch slipping state, the engine speed is maintained at a prescribed speed or higher.

4. The speed change control device of a working vehicle according to claim 2, wherein the controller performs a control in which, in the lockup and modulation clutch slipping state, the engine speed is maintained at a prescribed speed or higher.

5. The speed change control device of a working vehicle according to claim 1, wherein the speed change operator includes a kickdown switch, and the controller makes a transition to the torque converter operation state upon operation of the kickdown switch to be ON.

6. The speed change control device of a working vehicle according to claim 2, wherein the speed change operator includes a kickdown switch, and the controller makes a transition to the torque converter operation state upon operation of the kickdown switch to be ON.

* * * * *